(12) United States Patent
Tiwari et al.

(10) Patent No.: US 9,859,716 B2
(45) Date of Patent: Jan. 2, 2018

(54) HYBRID AC AND DC DISTRIBUTION SYSTEM AND METHOD OF USE

(71) Applicant: General Electric Company, Schenectady, NY (US)

(72) Inventors: Arvind Kumar Tiwari, Karnataka (IN); Yashomani Y. Kolhatkar, Karnataka (IN); Neeraj Agrawal, Karnataka (IN)

(73) Assignee: General Electric Company, Niskayuna, NY (US)

( * ) Notice: Subject to any disclaimer, the term of this patent is extended or adjusted under 35 U.S.C. 154(b) by 276 days.

(21) Appl. No.: 14/725,949

(22) Filed: May 29, 2015

(65) Prior Publication Data

US 2016/0352105 A1 Dec. 1, 2016

(51) Int. Cl.
| | | |
|---|---|---|
| H02J 5/00 | (2016.01) |
| H02M 3/04 | (2006.01) |
| H02M 7/04 | (2006.01) |
| H02M 7/44 | (2006.01) |
| H02J 1/10 | (2006.01) |

(52) U.S. Cl.
CPC ............ *H02J 5/00* (2013.01); *H02J 1/102* (2013.01); *H02M 3/04* (2013.01); *H02M 7/04* (2013.01); *H02M 7/44* (2013.01)

(58) Field of Classification Search
None
See application file for complete search history.

(56) References Cited

U.S. PATENT DOCUMENTS 5,473,528 A 12/1995 Hirata et al.
6,121,695 A 9/2000 Loh
(Continued)

FOREIGN PATENT DOCUMENTS

CN 202333831 U 7/2012
CN 202444318 U 9/2012
(Continued)

OTHER PUBLICATIONS

Zhou et al., "Grid-connected and islanded operation of a hybrid power system," Power Engineering Society Conference and Exposition in Africa, pp. 1-6 (2007).
Liu et al., "A Hybrid AC/DC Microgrid and Its Coordination Control," Smart Grid, IEEE Transactions on, vol. 2, Issue 2, pp. 278-286 (2011).
Byun Y.B., et al., "Parallel Operation of Three-Phase UPS Inverters by Wireless Load Sharing Control", Twenty-second International Telecommunications Energy Conference, Sep. 10-14, 2000, IEEE, pp. 526-532.
(Continued)

*Primary Examiner* — Jared Fureman
*Assistant Examiner* — Aqeel Bukhari
(74) *Attorney, Agent, or Firm* — Nitin N. Joshi (57) ABSTRACT

A hybrid AC and DC distribution system includes a doubly fed induction generator (DFIG), a DC distribution bus, an AC/DC converter, an AC distribution bus, and a DC/AC converter. The DFIG includes a rotor and a stator, and is configured to generate a first AC power at the rotor and a second AC power at the stator. The AC/DC converter is coupled to the rotor and the DC distribution bus. The AC/DC converter converts the first AC power to a first DC power at a first node for delivery to a first load through the DC distribution bus. The DC/AC converter is coupled between the first node and a second node coupled to the stator and the AC distribution bus. The DC/AC converter converts the first DC power to the second AC power at the second node for delivery to a second load through the AC distribution bus.

26 Claims, 7 Drawing Sheets

(56) References Cited

U.S. PATENT DOCUMENTS

| | | |
|---|---|---|
| 6,191,500 B1 | 2/2001 | Toy |
| 6,803,679 B1 | 10/2004 | Luo et al. |
| 7,400,066 B2 | 7/2008 | Tassitino, Jr. et al. |
| 7,425,779 B2 | 9/2008 | Luo et al. |
| 7,446,433 B2 | 11/2008 | Masciarelli et al. |
| 7,456,520 B2 | 11/2008 | Colombi et al. |
| 7,459,803 B2 | 12/2008 | Mosman |
| 7,566,988 B2 | 7/2009 | Heber et al. |
| 7,615,890 B2 | 11/2009 | Masciarelli et al. |
| 7,638,899 B2 | 12/2009 | Tracy et al. |
| 7,649,758 B2 | 1/2010 | Taimela et al. |
| 7,667,351 B2 | 2/2010 | Marwali et al. |
| 7,701,087 B2 | 4/2010 | Eckroad et al. |
| 7,825,541 B2 | 11/2010 | Herbener et al. |
| 7,980,905 B2 | 7/2011 | Rembach et al. |
| 8,022,572 B2 | 9/2011 | Vyas et al. |
| 8,035,250 B2 | 10/2011 | Caudill |
| 8,062,081 B2 | 11/2011 | Barrett et al. |
| 8,148,846 B2 | 4/2012 | Masciarelli et al. |
| 8,552,589 B2 | 10/2013 | Ghosh et al. |
| 8,604,640 B2 | 12/2013 | Masciarelli et al. |
| 8,786,262 B2 | 7/2014 | Rajashekara et al. |
| 2004/0084965 A1 | 5/2004 | Welches et al. |
| 2005/0052085 A1 | 3/2005 | Chang et al. |
| 2006/0006741 A1 | 1/2006 | Tassitino, Jr. et al. |
| 2006/0113800 A1 | 6/2006 | Willisch et al. |
| 2006/0167569 A1 | 7/2006 | Colombi et al. |
| 2007/0007825 A1 | 1/2007 | Heber et al. |
| 2007/0063677 A1 | 3/2007 | Schauder |
| 2009/0009001 A1 | 1/2009 | Marwali et al. |
| 2009/0009005 A1 | 1/2009 | Luo et al. |
| 2009/0273192 A1 | 11/2009 | Guven et al. |
| 2009/0278352 A1* | 11/2009 | Rivas ............ F03D 7/0224 290/44 |
| 2010/0002475 A1 | 1/2010 | Folts et al. |
| 2010/0096853 A1 | 4/2010 | Woldmann et al. |
| 2011/0106325 A1 | 5/2011 | Opina, Jr. et al. |
| 2011/0278932 A1 | 11/2011 | Navarro et al. |
| 2011/0278934 A1 | 11/2011 | Ghosh et al. |
| 2011/0309677 A1 | 12/2011 | Bourgeau |
| 2012/0001479 A1* | 1/2012 | Harpin ............ B63H 21/17 307/9.1 |
| 2012/0068541 A1 | 3/2012 | Anderson |
| 2013/0002014 A1 | 1/2013 | Moore et al. |
| 2013/0069432 A1 | 3/2013 | Beg et al. |
| 2013/0069434 A1 | 3/2013 | Beg et al. |
| 2013/0193760 A1 | 8/2013 | Colombi et al. |
| 2014/0139016 A1 | 5/2014 | Lovercheck et al. |
| 2015/0349687 A1* | 12/2015 | Liang ............ H02P 9/007 322/61 |

FOREIGN PATENT DOCUMENTS

| | | |
|---|---|---|
| CN | 202889279 U | 4/2013 |
| CN | 103560576 A | 2/2014 |
| DE | 10 2008 024 222 A1 | 2/2009 |
| DE | 10 2009 017 244 A1 | 10/2010 |
| EP | 1 006 641 A2 | 6/2000 |
| EP | 1 919 055 A2 | 5/2008 |
| EP | 2 101 392 A2 | 9/2009 |
| EP | 2 587 609 A1 | 5/2013 |
| EP | 2 608 355 A2 | 6/2013 |
| JP | 2005-33890 A | 2/2005 |
| KR | 10-1267513 B1 | 5/2013 |
| WO | 2004/025823 A1 | 3/2004 |
| WO | 2013123546 A1 | 8/2013 |
| WO | 2013/142561 A1 | 9/2013 |

OTHER PUBLICATIONS

Guerrero J.M., et al., "A high-performance DSP-controller for parallel operation of online UPS systems," Nineteenth Annual IEEE Applied Power Electronics Conference and Exposition, APEC' 04, Feb. 22-26, 2004, pp. 463-469.

Iwanski G. and Koczara W., "DFIG-Based Power Generation System With UPS Function for Variable-Speed Applications," IEEE Transactions on Industrial Electronics, vol. 55, Issue 8, Aug. 8, 2008, pp. 3047-3054.

Johnson B.K. and Lasseter R., "An Industrial Power Distribution System Featuring UPS Properties," 24th Annual IEEE Power Electronics Specialists Conference, PESC'93 Record, Jun. 20-24, 1993, pp. 759-765.

Mosman M., "An Isolated-Parallel UPS System for a Large Data Center," the Magazine of 7x24 Exchange International, Newslink, 2007, pp. 6-8.

Noworolski Z., "Parallel UPS Control and Configuration," Third International Telecommunications Energy Conference, INTELEC-London, England, May 19-21, 1981, pp. 205-209.

Sato E.K. and Kawamura A., "High Reliability and High Performance Parallel-Connected UPS System with Independent Control," Twenty-Seventh International Telecommunications Conference, Sep. 18-22, 2005, pp. 389-394.

Waris T. and Nayar C.V., "Variable speed constant frequency diesel power conversion system using doubly fed induction generator (DFIG)," Power Electronics Specialists Conference, 2008, PESC'2008, IEEE, Jun. 15-19, 2008, pp. 2728-2734.

Xing Y. et al., "Novel control for redundant parallel UPSs with instantaneous current sharing," Proceedings of the Power Conversion Conference, 2002, PCC-Osaka 2002, Abstract, vol. 3, Apr. 2-4, 2002, pp. 959-963.

Yao et al.,"Development of Communicationless Hot-Swap Paralleling for Single-Phase UPS Inverters Based on Adaptive Droop Method," Applied Power Electronics Conference and Exposition, Feb. 15, 2009, pp. 1283-1287.

Zhongyi H., and Xing Y., "Distributed Control for UPS Modules in Parallel Operation With RMS Voltage Regulation," IEEE Transactions on Industrial Electronics, vol. 55, No. 8, Feb. 22, 2008, pp. 2860-2869.

Extended European Search Report and Opinion issued in connection with related EP Application No. 15155175.1 dated Jun. 23, 2015.

Extended European Search Report and Opinion issued in connection with related EP Application No. 15157301.1 dated Aug. 14, 2015.

Extended European Search Report and Opinion issued in connection with related EP Application No. 15157305.2 dated Sep. 28, 2015.

Non-Final Rejection towards related U.S. Appl. No. 14/186,159 dated Sep. 23, 2016.

Extended European Search Report and Opinion issued in connection with corresponding EP Application No. 16170543.9 dated Oct. 24, 2016.

Extended European Search Report and Opinion issued in connection with related EP Application No. 16172123.8 dated Nov. 4, 2016.

Kolhatkar et al., U.S. Appl. No. 14/306,641, filed Jun. 17, 2014.
Kolhatkar et al., U.S. Appl. No. 14/306,791, filed Jun. 17, 2014.
Kolhatkar et al., U.S. Appl. No. 14/186,159, filed Feb. 21, 2014.
Tiwari et al., U.S. Appl. No. 14/732,215, filed Jun. 5, 2015.

* cited by examiner

HYBRID AC AND DC DISTRIBUTION SYSTEM AND METHOD OF USE

BACKGROUND

The field of the disclosure relates generally to electrical power distribution systems and, more particularly, to a hybrid alternating current (AC) and direct current (DC) distribution system and a method of use thereof.

Known electrical power distribution systems provide AC power or DC power to various electrical loads. Some electrical loads, marine ship loads, for example, create a need for an electrical power distribution system isolated from a typical utility grid. Such electrical power distribution systems are sometimes referred to as islanded systems or micro-grids. The various loads in an islanded system include, without limitation, drive loads, AC auxiliary loads, DC energy storage loads, and DC electronic loads. Possible power sources for islanded systems include, without limitation, generators and energy storage devices, such as batteries.

Known AC distribution systems utilize an AC distribution bus to distribute AC power to the location of a particular load. Some AC loads can be supplied directly, while others use a voltage conversion by a transformer or an AC-to-DC (AC/DC) conversion and subsequent DC-to-AC (DC/AC) conversion. DC loads use at least an AC/DC conversion. AC power sources, generators, for example, operate at a particular frequency to generate an appropriate voltage and frequency output to connect to the AC distribution bus. Similarly, known DC distribution systems utilize a DC distribution bus to distribute DC power to the location of a particular load. AC output from power sources is converted to DC before connecting to the DC distribution bus. Likewise, DC power on the DC distribution bus is converted to AC for various AC drive loads and auxiliary loads. DC energy storage loads and DC electronic loads are supplied directly or use a DC-to-DC (DC/DC) conversion to adjust voltage levels. The efficiency of known AC and DC distribution systems is reduced due to the number of electrical components used for conditioning generated power for distribution and distributed power for delivery to the various loads. The efficiency of known AC and DC distribution systems is further reduced by the inflexibility to consistently operate generators at peak efficiency due to variable load conditions.

BRIEF DESCRIPTION

In one aspect, a hybrid alternating current (AC) and direct current (DC) distribution system is provided. The hybrid AC and DC distribution system includes a doubly fed induction generator (DFIG), a DC distribution bus, an AC/DC converter, an AC distribution bus, and a DC/AC converter. The DFIG includes a rotor and a stator. The DFIG is configured to generate a first AC power at the rotor and a second AC power at the stator. The AC-to-DC converter is coupled to the rotor and the DC distribution bus at a first node. The AC-to-DC converter is configured to convert the first AC power to a first DC power at the first node for delivery to a first load through the DC distribution bus. The DC-to-AC converter is coupled between the first node and a second node. The second node is coupled to the stator and the AC distribution bus. The DC-to-AC converter is configured to convert the first DC power to the second AC power for delivery to the stator and the second load through the AC distribution bus.

In another aspect, a method of operating a hybrid alternating current (AC) and direct current (DC) distribution system is provided. The method includes generating a first AC power at a rotor and a second AC power at a stator for a doubly fed induction generator (DFIG). The method further includes converting the first AC power to a first DC power at a first node. The method further includes coupling the first DC power to a DC distribution bus. The method further includes delivering the first DC power to a first load coupled to the DC distribution bus. The method further includes converting the first DC power to the second AC power at a second node. The method further includes coupling the second node to an AC distribution bus and a stator for the DFIG. The method further includes delivering the second AC power to a second load coupled to the AC distribution bus.

In yet another aspect, an islanded electrical system is provided. The islanded electrical system includes a doubly fed induction generator (DFIG), a direct current (DC) ring bus, an alternating current to direct current (AC/DC) converter, an alternating current (AC) ring bus, a DC/AC converter, and an energy store. The DFIG includes a rotor and a stator. The DFIG is configured to generate a first AC power at the rotor and a second AC power at the stator. The DC ring bus is directly couplable to a DC electronic load. The DC ring bus is further configured to be coupled to a first drive load through a first load-side DC/AC converter. The AC/DC converter is coupled to the rotor and the DC ring bus at a first node. The AC/DC converter is configured to convert the first AC power to a first DC power at the first node for delivery to the DC ring bus. The AC ring bus is directly couplable to an AC auxiliary load. The AC ring bus is further configured to be coupled to a second drive load through a load-side AC/DC converter and a second load-side DC/AC converter. The DC/AC converter is coupled between the first node and a second node. The second node is coupled to the stator and the AC ring bus. The DC/AC converter is configured to convert the first DC power to the second AC power for delivery to the stator and the AC ring bus. The energy store is coupled to the first node through a DC/DC converter.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the present disclosure relate to electrical power distribution systems for islanded utility grids. The hybrid alternating current (AC) and direct current (DC) distribution systems described herein provide efficient AC and DC power for variable loads and, more specifically, parallel AC and DC distribution busses. Parallel AC and DC distribution busses reduce the number of electronic components to condition generated power for consumption by a given load. Exemplary electrical power distribution systems utilize fewer electronic components, thereby improving the overall efficiency of the electrical power distribution systems. Exemplary electrical power distribution systems also use doubly fed induction generators (DFIGs) as a power source, permitting use of a variable speed engine to better match real-time loads and real-time power production, thus improving efficiency further. Improved efficiency and fewer electronic components lead to operational cost savings as well as reduced capital expenditures.

Figure 1:
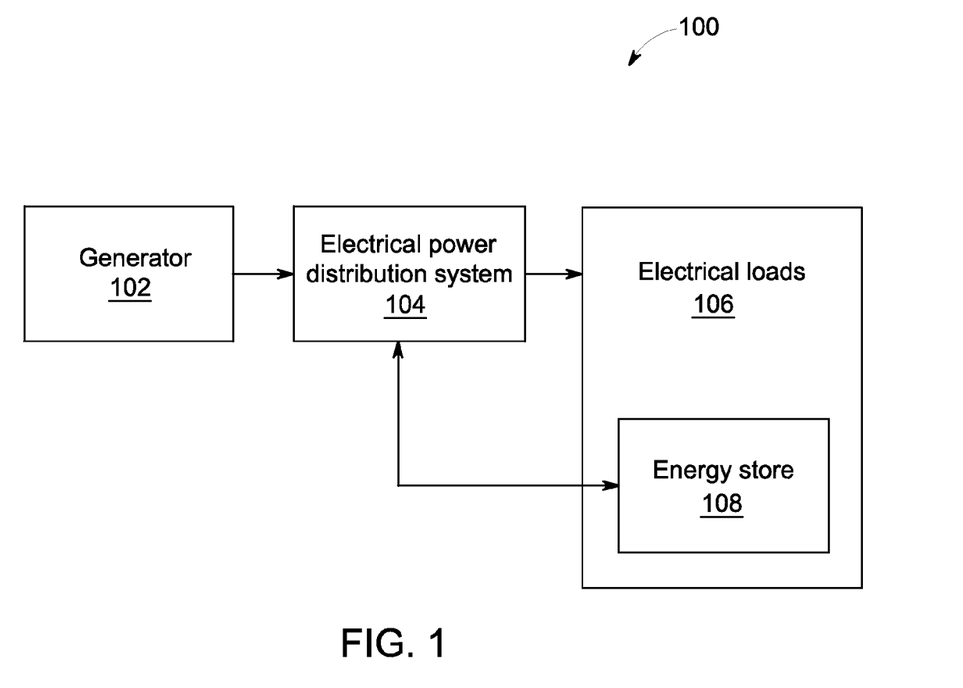
FIG. 1 is a block diagram of an exemplary islanded electrical system.

FIG. 1 is a diagram of an exemplary islanded electrical system 100. Islanded electrical system 100 includes a generator 102, an electrical power distribution system 104, electrical loads 106, and energy store 108. In certain embodiments, for example and without limitation, generator 102 is a DFIG driven by a variable speed engine. Variable speed engines include, without limitation, diesel engines, gas engines, and gas turbine engines. Electrical loads 106 include, without limitation, AC loads such as drive loads (motors, for example) and AC auxiliary loads, and DC loads such as DC electronics and energy store 108. Energy store 108 includes, for example and without limitation, batteries. Energy store 108, in certain embodiments, includes multiple energy storage devices distributed throughout islanded electrical system 100. In such an embodiment, energy store 108 can be controlled centrally, or each energy storage device independently. In other embodiments, energy store 108 includes one or more energy storage device centrally disposed in islanded electrical system 100 and centrally controlled.

Generator 102 generates AC and DC power that is supplied to electrical power distribution system 104. Electrical power distribution system 104 conditions and delivers the AC and DC power to the various components of electrical loads 106. Electrical power distribution system 104 includes, without limitation, AC busses, DC busses, AC-to-DC (AC/DC) converters, DC-to-AC (DC/AC) converters, DC-to-DC (DC/DC) converters, transformers, and protection devices such as, for example and without limitation, chokes, AC circuit breakers, DC circuit breakers, and protection ties.

A choke is a current limiting device that operates on non-zero frequency current. A protection tie similarly operates on DC, temporarily diverting DC to facilitate opening of a DC switch, such as a DC circuit breaker.

Figure 2:
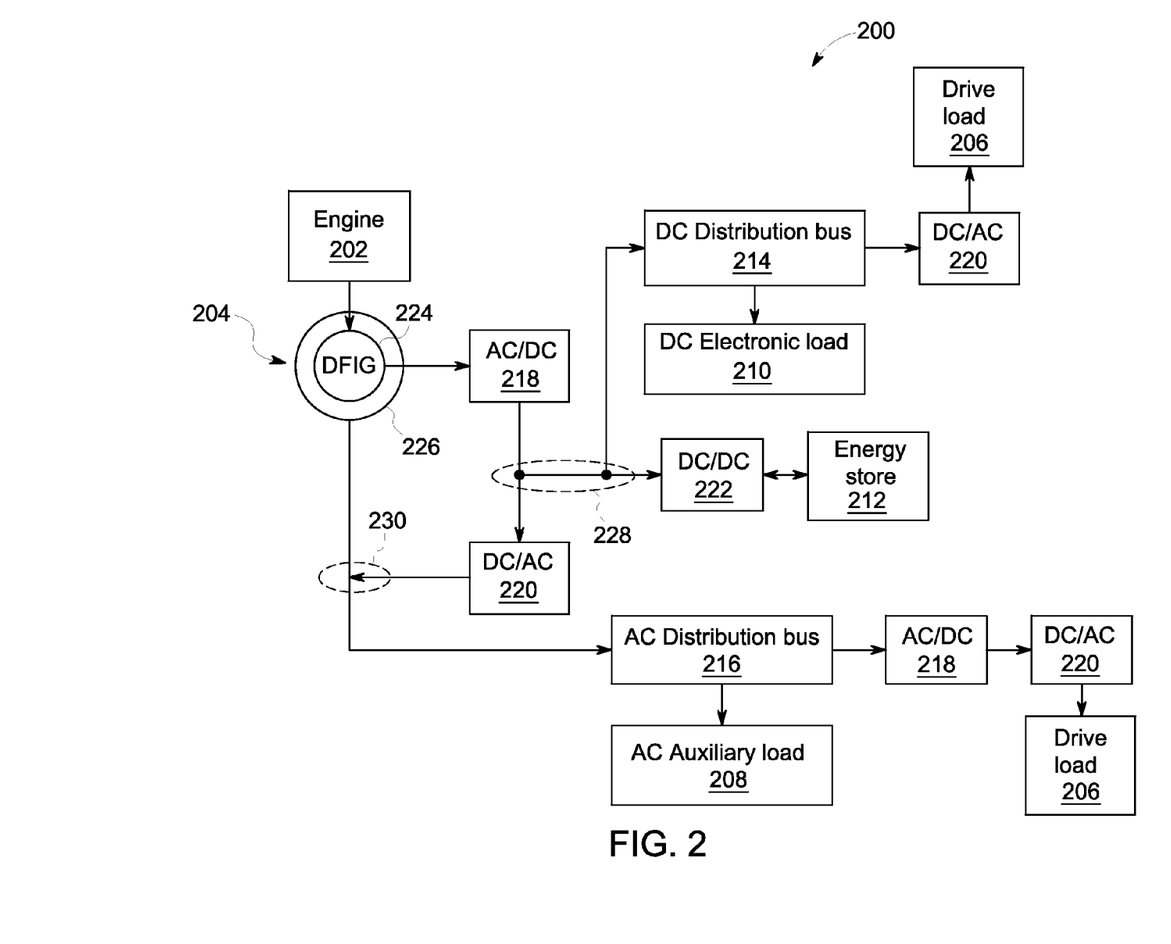
FIG. 2 is a block diagram of an exemplary hybrid alternating current (AC) and direct current (DC) distribution system for use in the islanded electrical system shown in FIG. 1.

FIG. 2 is a block diagram of an exemplary hybrid AC and DC distribution system 200 for use in islanded electrical system 100 (shown in FIG. 1). Hybrid AC and DC distribution system 200 includes an engine 202, a DFIG 204, drive loads 206, AC auxiliary load 208, DC electronic load 210, energy store 212, DC distribution bus 214, AC distribution bus 216, AC/DC converters 218, DC/AC converters 220, and DC/DC converter 222.

Engine 202 is mechanically coupled to DFIG 204 and, more specifically, to a rotor 224 of DFIG 204. During operation, engine 202 is driven at a variable speed to turn rotor 224, which, in combination with a stator 226, generates AC power. The variable speed of engine 202 is controlled according to the time-varying load defined at least partially by DC electronic load 210, drive loads 206, AC auxiliary load 208, and energy store 212. In certain embodiments, hybrid AC and DC distribution system 200 includes a controller configured to control the variable speed of engine 202 according to the time-varying load and an efficiency of engine 202. In certain embodiments, hybrid AC and DC distribution system 200 includes multiple DFIGs and engines. In such embodiments, hybrid AC and DC distribution system 200 may include one centralized controller for controlling the variable speed of the respective engines according to the time-varying load and the efficiency of the respective engines. The centralized controller facilitates centralized control for peak shaving, emission control, engine ramping, load balancing among AC and DC loads, and battery integration. In alternative embodiments, where hybrid AC and DC distribution system 200 includes multiple DFIGs and engines, multiple controllers are used to control the variable speed of the engines according to the time-varying load and the respective efficiency of the engines.

DFIG 204 generates AC power at both stator 226 and rotor 224, depending on the speed of rotor 224. The generated AC power at rotor 224 is supplied to AC/DC converter 218. AC/DC converter 218 converts the generated AC power, i.e., the first AC power, to a first DC power at a first node 228. A second AC power is generated at stator 226 and is supplied to DC/AC converter 220 at a second node 230. DC/AC converter 220 converts the generated AC power, i.e., the second AC power, to the first DC power at first node 228. First node 228 serves as a DC tapping point, supplying the first DC power to DC distribution bus 214, DC/DC converter 222, and, depending on the speed of rotor 224, to AC/DC converter 218. DC/AC converter 220 converts the first DC power back to the second AC power at stator 226. Second node 230 is coupled to stator 226 of DFIG 204, as well as AC distribution bus 216, which facilitates voltage and frequency matching of the first AC power generated by DFIG 204 and the second AC power supplied to AC distribution bus 216.

In certain embodiments, at start-up of DFIG 204, energy available at first node 228 or second node 230 is used to crank rotor 224 of DFIG 204 up to a desired speed, which utilizes the induction motor feature of DFIG 204.

DC/DC converter 222 converts the first DC power to a second DC power suitable to charge energy store 212. Direct coupling of energy store 212 and DC/DC converter 222 to first node 228 facilitates efficient energy storage during normal operation and efficient energy supply by energy store 212 when engine 202 or DFIG 204 are inoperable or disconnected. In alternative embodiments, one or more DC/DC converter 222 can be used to shift DC voltage levels appropriately for a given DC load. In certain embodiments, DC/DC converter 222 utilizes a high frequency transformer to provide isolation between DC voltage levels.

DC distribution bus 214 delivers DC power to DC electronic load 210 and drive load 206. DC electronic load 210 includes, without limitation, DC electronics such as computing devices, lights, and relays that operate at various DC voltage levels. The distributed voltage, 48 volts, for example and without limitation, is stepped up or down to the appropriate voltage for a particular DC electronic device. Drive load 206 is an AC load requiring a DC/AC conversion by DC/AC converter 220. DC/AC converter 220 converts the first DC power to a third AC power. Utilization of DC distribution bus 214 and DC/AC converter 220 for drive load 206 is advantageous in that certain known AC distribution systems necessitate multiple electronic components for conversion of the distributed AC power to a useable AC power.

AC distribution bus 216 delivers AC power to AC auxiliary load 208 and drive load 206. AC auxiliary load 208 includes, without limitation, typical AC electronics such as lighting, televisions, coffee makers, refrigerators, hair dryers, vacuums, and personal computers. Drive load 206, as described above, requires the distributed AC power, i.e., the second AC power, be converted to a useable level. AC distribution bus 216 delivers the second AC power to AC/DC converter 218, which converts it to the third DC power. The third DC power is then converted by DC/AC converter 220 to the third AC power for consumption by drive load 206.

Figure 3:
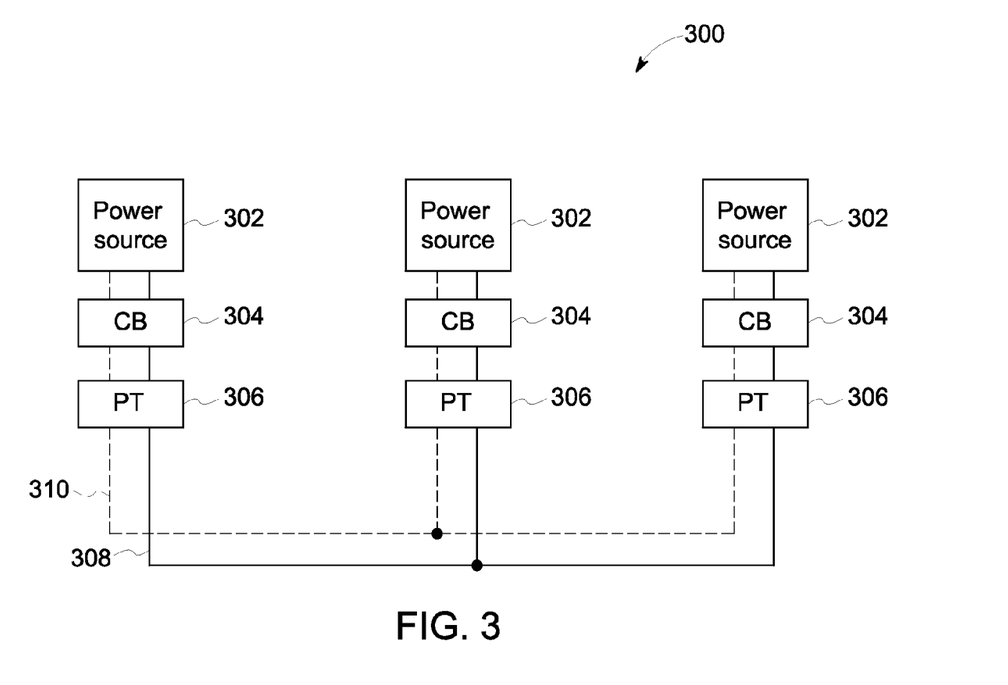
FIG. 3 is a schematic diagram of an exemplary DC ring bus for use in the hybrid AC and DC distribution system shown in FIG. 2.

FIG. 3 is a schematic diagram of an exemplary DC ring bus 300 for use in hybrid AC and DC distribution system 200 (shown in FIG. 2). DC ring bus 300 includes multiple power sources 302 coupled through DC circuit breakers (CBs) 304 and protection ties (PTs) 306 to a positive DC bus 308 and a negative DC bus 310. For each of power sources 302, positive DC bus 308 and negative DC bus 310 are interruptible by DC circuit breaker 306, which is aided in operation by protection tie 306. The architecture of DC ring bus 300 facilitates isolation of a fault in one of the power source branches.

Figure 4:
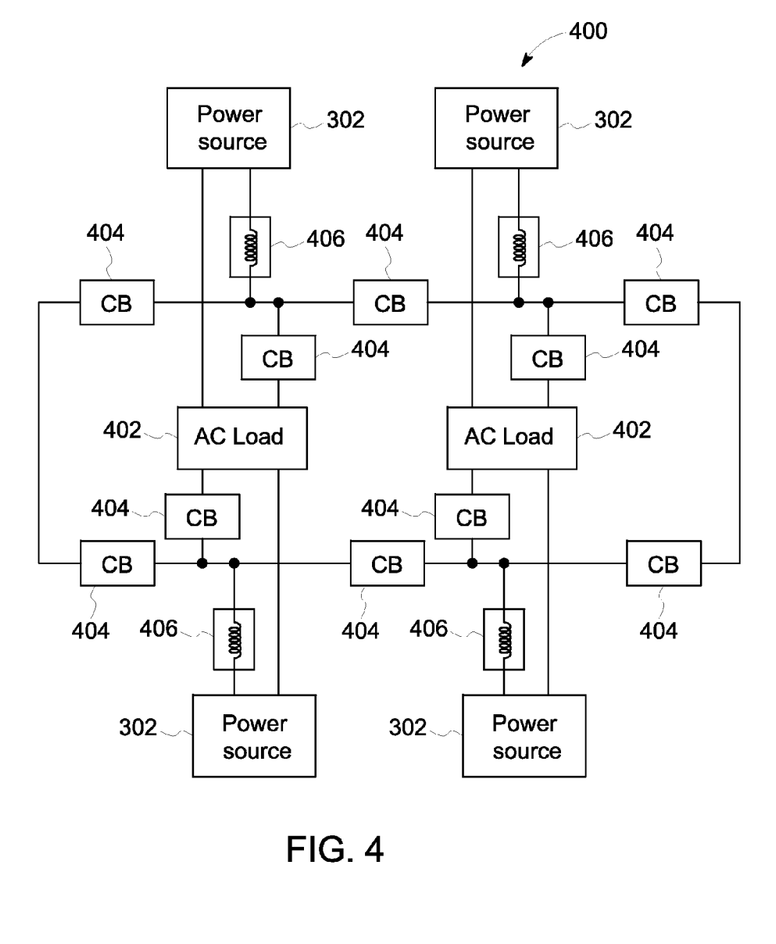
FIG. 4 is a schematic diagram of an exemplary AC ring bus for use in the hybrid AC and DC distribution system shown in FIG. 2.

FIG. 4 is a schematic diagram of an exemplary AC ring bus 400 for use in hybrid AC and DC distribution system 200 (shown in FIG. 2). AC ring bus 400 includes multiple power sources 302 (shown in FIG. 3), AC loads 402, AC circuit breakers 404, and chokes 406. Power sources 302 are coupled to AC ring bus 400 through chokes 406 and are independently isolatable by AC circuit breakers 404. AC loads 402 are likewise isolatable by AC circuit breakers 404.

Figure 5:
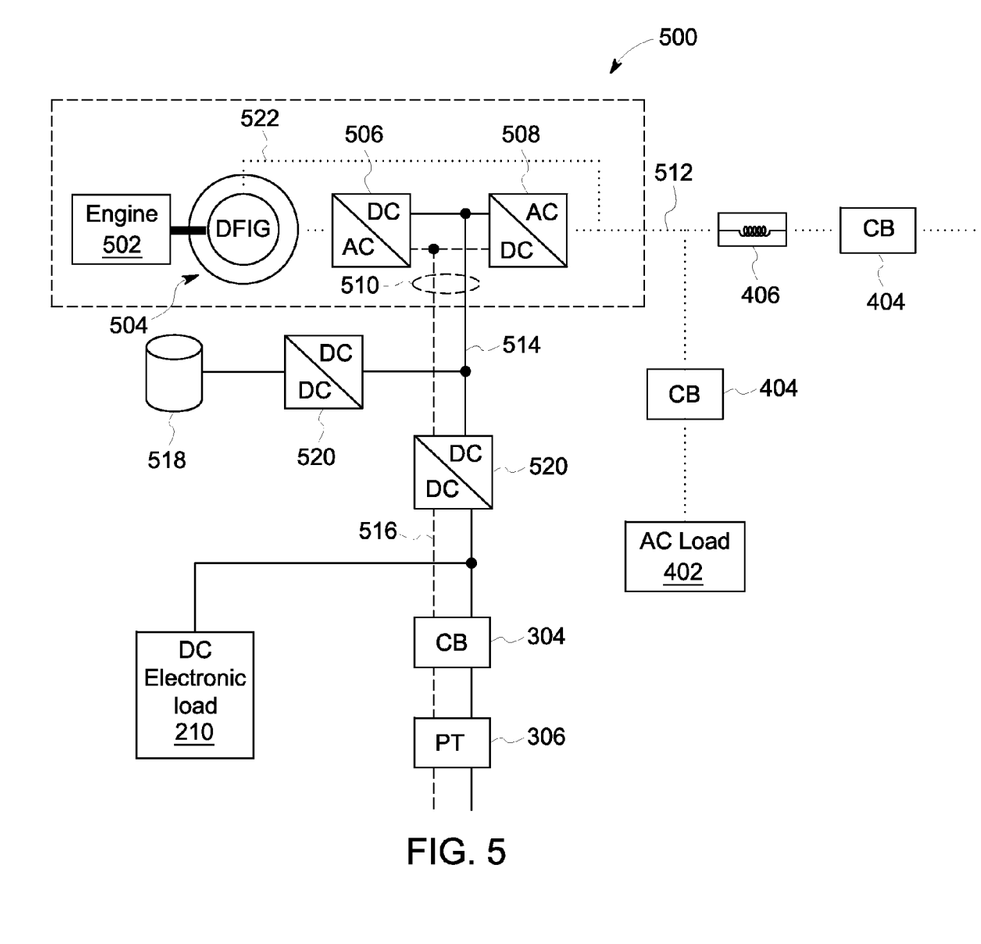
FIG. 5 is a schematic diagram of an exemplary power source for use in the DC ring bus shown in FIG. 3 or the AC ring bus shown in FIG. 4.

FIG. 5 is a schematic diagram of an exemplary power source 500 for use in DC ring bus 300 (as power source 302 shown in FIG. 2) or AC ring bus 400 (as power source 302 shown in FIG. 4). Power source 500 includes an engine 502, a DFIG 504, an AC/DC converter 506, and a DC/AC converter 508. Power source 500 is coupled to a DC node 510 and an AC node 512, which are equivalent to first node 228 and second node 230 (shown in FIG. 2). DC node 510 includes a positive DC bus 514 and a negative DC bus 516, and is couplable to an energy store 518 through a DC/DC converter 520.

Engine 502 is mechanically coupled to DFIG 504 and, more specifically, to a rotor (not shown) of DFIG 504. Engine 502 is configured at a variable speed and turns the rotor to generate a first AC power. The first AC power is received at AC/DC converter 506 and converted to a first DC power. The first DC power is supplied to DC/AC converter 508.

DC/AC converter 508 converts the first DC power to a second AC power at AC node 512 that is supplied to a feedback bus 522. Feedback bus 522 couples back to DFIG 504 at a stator (not shown) for DFIG 504. AC node 512 further couples to an AC distribution bus (not shown) through choke 406 and AC circuit breaker 404 (shown in FIG. 4). AC node 512 further couples to AC load 402 through circuit breaker 404 (also shown in FIG. 4).

One of DC/DC converters 520 converts the first DC power to a second DC power for charging energy store 518. Another of DC/DC converters 520 converts the first DC power to a third DC power for supplying DC electronic load 210 (shown in FIG. 2) and a DC distribution bus (not shown). The third DC power is supplied to the DC distribution bus through DC circuit breaker 304 and protection tie 306 (shown in FIG. 3).

In certain embodiments, AC circuit breaker 404 and DC circuit breaker 304 are controlled by a common device (not shown). The common device, in certain embodiments, is located internal to hybrid AC and DC distribution system 200 (shown in FIG. 2). In alternative embodiments, the common device is located external to hybrid AC and DC distribution system 200. In certain embodiments, AC circuit breaker 404 and DC circuit breaker 304 are controlled independently. In other embodiments, AC circuit breaker 404 and DC circuit breaker 304 are controlled dependently, or together. The control device includes, for example and without limitation, DC electronics such as relays, a microcontroller, digital logic circuits, a field programmable gate array (FPGA), and an application specific integrated circuit (ASIC). Any fault detected on the AC distribution bus or the DC distribution bus results in opening AC circuit breaker 404, DC circuit breaker 304, or both to secure total health of the distribution system.

Figure 6:
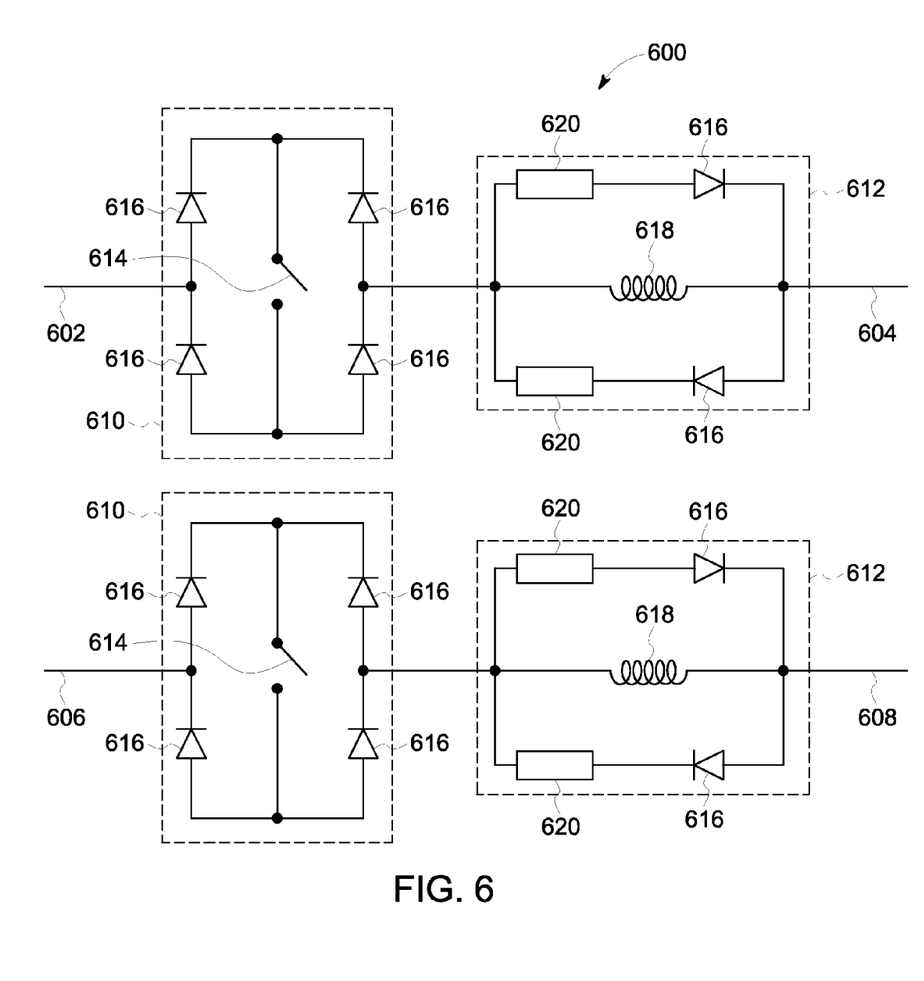
FIG. 6 is a schematic diagram of an exemplary protection tie for use in the DC ring bus shown in FIG. 3.

FIG. 6 is a detailed schematic diagram of an exemplary protection tie 600 for use in DC ring bus 300 (shown in FIG. 3 and FIG. 5). Protection tie 600 is coupled between a source-side positive DC bus 602 and a load-side positive DC bus 604, and also between a source-side negative DC bus 606 and a load-side negative DC bus 608. Protection tie 600 includes bidirectional switches 610 and current limiters 612.

Each of bidirectional switches 610 includes a switch 614 and diodes 616. For a given current direction, current passes through switch 614 and like-polarity diodes with respect to the current source, which is either source-side or load side. Each of current limiters 612 includes diodes 616, an inductor 618, and impedances 620. Inductor 618 is coupled in-line with the bus and in parallel with series-coupled diodes 616 and impedances 620. Diodes 618 are configured to be antiparallel.

During normal operation, the frequency of current on the DC bus is ideally zero, and inductor 618 is a negligible impedance. During a fault or transient condition, inductor 618 becomes an impedance for non-zero frequency current corresponding to the rise in current. Anti-parallel diodes 616 present a free-wheeling path for the current due to stored energy in inductor 618 during and after opening of protection tie 600. The load-side and source-side are then disconnected by switches 614 and a DC circuit breaker (not shown).

In alternative embodiments, switches 610 include any switch having bidirectional current blocking capability, including, for example, and without limitation, mechanical circuit breakers and semiconductor-based solid state switches.

Figure 7:
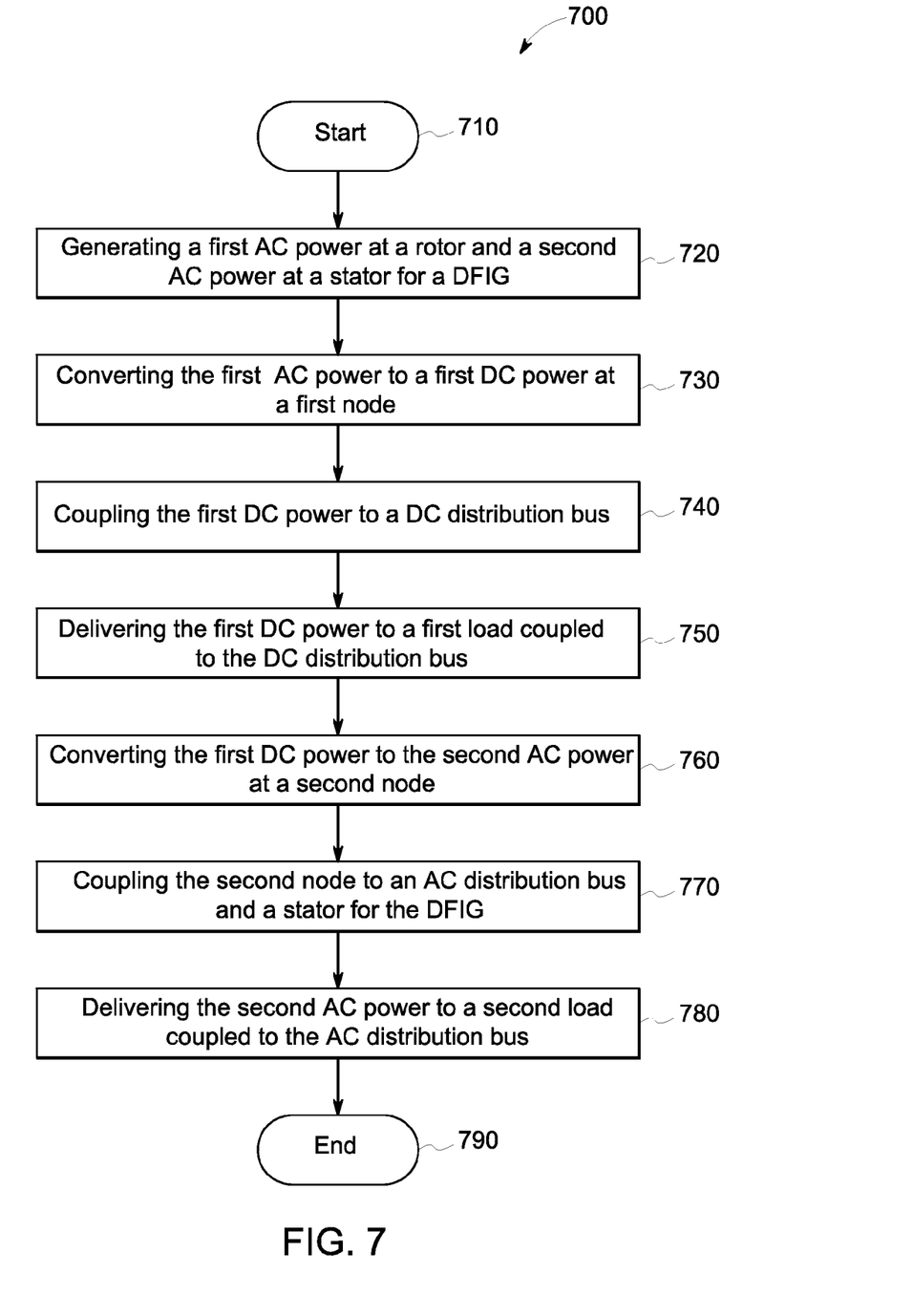
FIG. 7 is a flow diagram of an exemplary method of operating the hybrid AC and DC distribution system shown in FIG. 2.

FIG. 7 is a flow diagram of an exemplary method 700 of operating hybrid AC and DC distribution system 200 (shown in FIG. 2). Method 700 begins at a start step 710. At a generation step 720, a first AC power is generated at rotor 224 and stator 226 of DFIG 204 (all shown in FIG. 2). Rotor 224 is turned by engine 202 at a variable speed according to the load at a given time. The first AC power is converted to a first DC power at a DC converting step 730. The first AC power is converted by AC/DC converter 218 to the first DC power at first node 228. At a DC coupling step 740, the first DC power, at first node 228 is coupled to DC distribution bus 214. The first DC power on DC distribution bus 214 is then delivered to a first load coupled to DC distribution bus 214 at DC distribution step 750. The first load includes, for example and without limitation, a DC electronic load, such as DC electronic load 210, and a drive load, such as drive load 206.

At an AC converting step 760, the first DC power is converted to a second AC power by DC/AC converter 220. The second AC power is coupled, at AC coupling step 770, to AC distribution bus 216 and stator 226 of DFIG 204 at second node 230. The second AC power supplied to stator 226 of DFIG 204 facilitates DFIG 204 generating the first AC power at the appropriate voltage and frequency for AC distribution bus 216. The second AC power is then delivered, at an AC distribution step 780, to a second load coupled to AC distribution bus 216 at second node 230. The second load includes, for example and without limitation, an AC auxiliary load, such as AC auxiliary load 208, and a drive load, such as drive load 206.

In certain embodiments, method 700 includes a charging step. During the charging step, the first DC power is passed through DC/DC converter 222 and on to energy store 212. The method ends at an end step 790.

The above described electrical power distribution systems provide efficient AC and DC power for variable loads and, more specifically, a parallel AC distribution bus and DC distribution bus. Parallel AC and DC distribution busses reduce the necessary electronic components to condition generated power for consumption by a given load. Exemplary electrical power distribution systems utilize fewer electronic components, improving the overall efficiency of the electrical power distribution system. Exemplary electrical power distribution systems also use doubly fed induction generators (DFIGs) as a power source, permitting use of a variable speed engine to better match the load and power production, thus improving efficiency further. Improved efficiency and fewer electronic components lead to operational cost savings as well as reduced capital expenditures.

An exemplary technical effect of the methods, systems, and apparatus described herein includes at least one of: (a) improved efficiency through use of variable speed engines; (b) improved power generation and load matching; (c) fewer electronic components for power conversion; (d) reduced capital expenditure; and (e) reduced operational cost.

Exemplary embodiments of methods, systems, and apparatus for electrical power distribution systems are not limited to the specific embodiments described herein, but rather, components of systems and/or steps of the methods may be utilized independently and separately from other components and/or steps described herein. For example, the methods may also be used in combination with other non-conventional electrical power distribution systems, and are not limited to practice with only the systems and methods as described herein. Rather, the exemplary embodiment can be implemented and utilized in connection with many other applications, equipment, and systems that may benefit from increased efficiency, reduced operational cost, and reduced capital expenditure.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A hybrid alternating current (AC) and direct current (DC) distribution system, comprising:
   a doubly fed induction generator (DFIG) comprising a rotor and a stator, the DFIG configured to generate a first AC power at the rotor and a second AC power at the stator;
   a DC distribution bus configured to be coupled to a first load;
   an AC-to-DC converter coupled to the rotor and further coupled to the DC distribution bus at a first node, the AC-to-DC converter configured to convert the first AC power to a first DC power at the first node for delivery through the DC distribution bus;
   an AC distribution bus configured to be coupled to a second load; and
   a DC-to-AC converter coupled between the first node and a second node, the second node coupled to the stator and the AC distribution bus, the DC-to-AC converter configured to convert the first DC power to the second AC power for delivery to the stator and through the AC distribution bus.

2. The hybrid AC and DC distribution system in accordance with claim 1, further comprising:
   an energy store configured to receive a second DC power; and
   a DC-to-DC converter coupled between the first node and the energy store, the DC-to-DC converter configured to convert the first DC power to the second DC power, wherein the energy store is further configured to provide the second AC power to the second node through the DC-to-DC converter and the DC-to-AC converter.

3. They hybrid AC and DC distribution system in accordance with claim 1, wherein the first load comprises a drive load.

4. The hybrid AC and DC distribution system in accordance with claim 3, further comprising a load-side DC-to-AC converter coupled between the DC distribution bus and the drive load, the load-side DC-to-AC converter configured to convert the first DC power to a third AC power for delivery to the drive load.

5. The hybrid AC and DC distribution system in accordance with claim 1, wherein the second load comprises a drive load.

6. The hybrid AC and DC distribution system in accordance with claim 5, further comprising:
a load-side AC-to-DC converter coupled to the AC distribution bus, the load-side AC-to-DC converter configured to convert the second AC power to a third DC power; and
a load-side DC-to-AC converter coupled between the load-side AC-to-DC converter and the drive load, the load-side DC-to-AC converter configured to convert the third DC power to a third AC power for delivery to the drive load.

7. The hybrid AC and DC distribution system in accordance with claim 1, wherein the DC distribution bus comprises a DC ring bus coupled to a second power source and a DC load.

8. The hybrid AC and DC distribution system in accordance with claim 7, wherein the DC ring bus is coupled to the first node through a protection tie and a DC circuit breaker.

9. The hybrid AC and DC distribution system in accordance with claim 1, wherein the AC distribution bus comprises an AC ring bus.

10. The hybrid AC and DC distribution system in accordance with claim 9, wherein the AC ring bus is coupled to the second node through an AC circuit breaker and a choke.

11. A method of operating a hybrid alternating current (AC) and direct current (DC) distribution system, the method comprising:
generating a first AC power at a rotor and a second AC power at a stator, using a doubly fed induction generator (DFIG);
converting the first AC power to a first DC power at a first node, using an AC-to-DC converter;
coupling the first DC power to a DC distribution bus;
delivering the first DC power to a first load coupled to the DC distribution bus;
converting the first DC power to the second AC power at a second node, using a DC-to-AC converter;
coupling the second node to an AC distribution bus and a stator of the DFIG; and
delivering the second AC power to a second load coupled to the AC distribution bus.

12. The method in accordance with claim 11, further comprising converting the first DC power to a second DC power for delivery to an energy store.

13. The method in accordance with claim 11, wherein delivering the first DC power the first load comprises:
converting the first DC power to a third AC power; and
supplying the third AC power to the first load.

14. The method in accordance with claim 11, wherein delivering the second AC power to the second load comprises:
converting the second AC power to a second DC power;
converting the second DC power to a third AC power; and
supplying the third AC power to the second load.

15. An islanded electrical system, comprising:
a doubly fed induction generator (DFIG) comprising a rotor and a stator, the DFIG configured to generate a first alternating current (AC) power at the rotor and a second AC power at the stator;
a direct current (DC) ring bus directly couplable to a DC electronic load and configured to be coupled to a first drive load through a first load-side DC-to-AC converter;
an AC-to-DC converter coupled to the rotor and further coupled to the DC ring bus at a first node, the AC-to-DC converter configured to convert the first AC power to a first DC power at the first node for delivery to the DC ring bus;
an AC ring bus directly couplable to an AC auxiliary load and configured to be coupled to a second drive load through a load-side AC-to-DC converter and a second load-side DC-to-AC converter;
a DC-to-AC converter coupled between the first node and a second node, the second node coupled to the stator and the AC ring bus, the DC-to-AC converter configured to convert the first DC power to the second AC power for delivery to the stator and the AC ring bus; and
an energy store coupled to the first node through a DC-to-DC converter.

16. The islanded electrical system in accordance with claim 15, wherein the DC ring bus couples to the first node through a DC circuit breaker and a protection tie.

17. The islanded electrical system in accordance with claim 16, wherein the AC ring bus couples to the second node through an AC circuit breaker and a choke.

18. The islanded electrical system in accordance with claim 17, wherein the DC circuit breaker and the AC circuit breaker are independently controllable by a controller.

19. The islanded electrical system in accordance with claim 15, further comprising an engine having a drive shaft coupled to the DFIG and configured to turn the rotor at a variable speed.

20. The islanded electrical system in accordance with claim 19, wherein the engine is configured to turn the rotor at a speed determined based on a variable load level and a fuel efficiency of the engine, the variable load level at least partially defined by the first drive load, the second drive load, the DC electronic load, and the AC auxiliary load.

21. The islanded electrical system in accordance with claim 20, further comprising a controller configured to determine the variable speed at which the rotor turns according to the variable load level and the fuel efficiency.

22. The islanded electrical system in accordance with claim 21, further comprising a second DFIG coupled to a second engine and configured to turn at a second variable speed.

23. The islanded electrical system in accordance with claim 22, wherein the controller is further configured to determine the second variable speed according to the variable load level and a second fuel efficiency of the second engine.

24. The islanded electrical system in accordance with claim 19, wherein the second AC power at the second node is used to crank the rotor of the DFIG.

25. The islanded electrical system in accordance with claim 15, wherein the energy store is disposed centrally with respect to the first node and the DC ring bus.

26. The islanded electrical system in accordance with claim 15, further comprising a second power source couplable to the DC ring bus through a DC circuit breaker and a protection tie, the second power source further couplable to the AC ring bus through an AC circuit breaker and a choke.

\* \* \* \* \*